US009885437B2

(12) United States Patent
Liu (10) Patent No.: US 9,885,437 B2
(45) Date of Patent: Feb. 6, 2018

(54) FLUID SHUNT DEVICE (71) Applicant: FITOK Incorporated, Shenzhen, Guangdong (CN)

(72) Inventor: Chao Liu, Guangdong (CN)

(73) Assignee: FITOK INCORPORATED, Shenzhen, Guangdong (CN)

(*) Notice: Subject to any disclaimer, the term of this patent is extended or adjusted under 35 U.S.C. 154(b) by 584 days.

(21) Appl. No.: 14/592,028

(22) Filed: Jan. 8, 2015

(65) Prior Publication Data
US 2016/0061371 A1 Mar. 3, 2016

(30) Foreign Application Priority Data

Aug. 27, 2014 (CN) .......................... 2014 1 0442678

(51) Int. Cl.
F16L 41/00 (2006.01)
F16L 41/02 (2006.01)
F16L 41/14 (2006.01)

(52) U.S. Cl.
CPC ............... F16L 41/02 (2013.01); F16L 41/14 (2013.01)

(58) Field of Classification Search
CPC ......... F16L 41/04; F16L 41/08; F16L 41/086; F16L 41/12
USPC ... 285/139.1, 139.2, 139.3, 140.1, 208, 194, 285/203, 204, 195, 207, 192, 1, 89, 189
See application file for complete search history.

(56) References Cited

U.S. PATENT DOCUMENTS

| 978,504 | A | * | 12/1910 | Stewart | F16L 41/001 285/209 |
| 1,364,814 | A | * | 1/1921 | Saucke | F16L 41/14 285/208 |
| 1,541,725 | A | * | 6/1925 | Nelson | F16L 41/14 220/243 |
| 1,784,637 | A | * | 12/1930 | Lindgren | F16L 41/14 285/208 |
| 2,568,301 | A | * | 9/1951 | Pottberg | F16L 41/14 285/192 |
| 3,181,899 | A | * | 5/1965 | McKnight, Jr. | F16L 41/14 285/139.2 |
| 3,812,910 | A | * | 5/1974 | Wellstein | E21B 33/00 166/85.2 |
| 4,037,654 | A | * | 7/1977 | Lien | E21B 33/00 166/85.2 |
| 4,056,144 | A | * | 11/1977 | Wellstein | E21B 33/00 166/85.2 |
| 4,168,838 | A | * | 9/1979 | Bowen | F16J 15/104 277/606 |

(Continued)

Primary Examiner — Aaron M Dunwoody
(74) Attorney, Agent, or Firm — Ladas & Parry LLP (57) ABSTRACT This invention relates to pipeline connection, and discloses specifically a fluid shunt device, comprising a container and one or more branch pipeline connection devices; wherein the branch pipeline connection device comprises a joint, a gland, a sealing piece and a lock piece; the front end of the joint is passed sequentially through the inner hole of the gland and the sealing piece, inserted into the container through the circular hole, and connected with the lock piece in the container, thus the sealing piece is clamped tightly by the joint between the container and the gland along the axial direction of the joint. The sealing for the connection between the branch pipeline connection devices and the container is reliable, and the technique for the processing of the product is simple.

19 Claims, 9 Drawing Sheets (56) References Cited

U.S. PATENT DOCUMENTS 5,997,046 A * 12/1999 Hoeptner, III .......... F16L 41/04
166/242.6

* cited by examiner

FLUID SHUNT DEVICE

TECHNICAL FIELD

The present invention generally relates to pipeline connection, and more particularly, to a connection device for diverting fluids from a main pipeline or a container to branch pipelines, and a fluid shunt device using such connection device.

PRIOR ART

Figure 1:
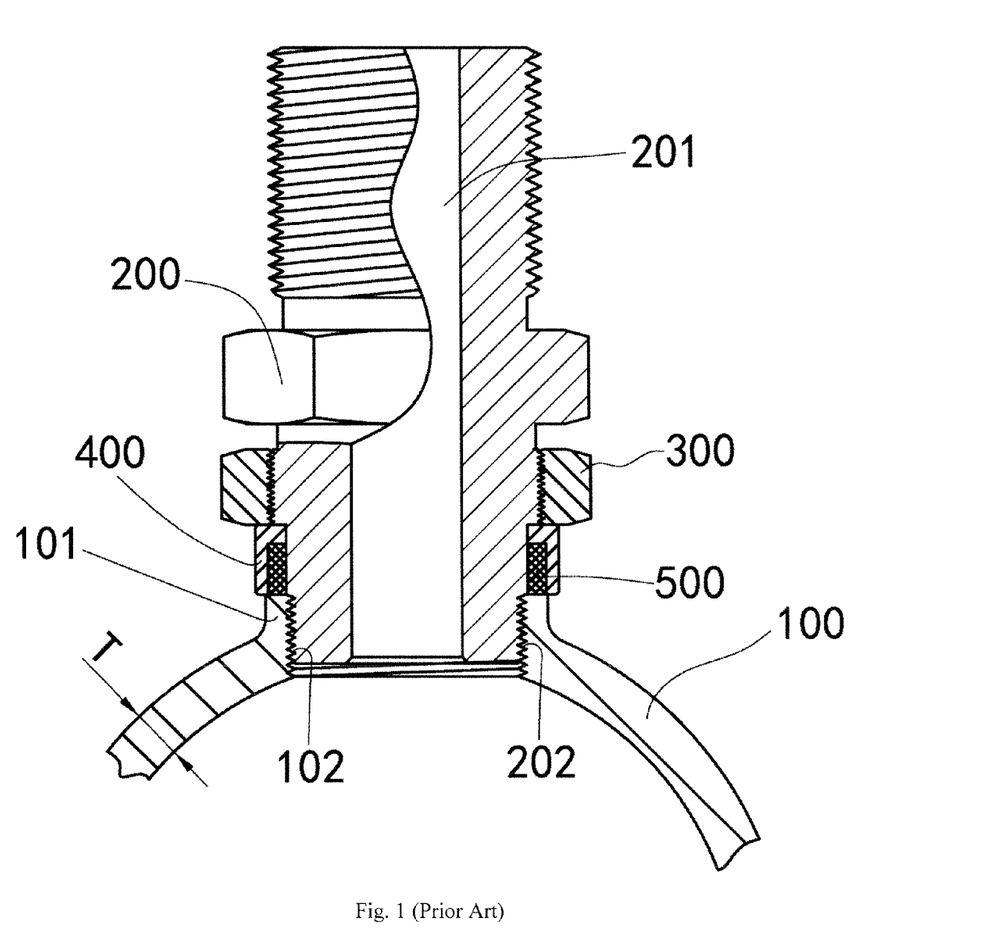
FIG. 1 is a sectional view of a branch pipeline joint according to the prior art.

Delivery ducts for liquids and gases are widely used in the industries of petroleum, chemical, electric power generation and pharmaceuticals. In production applications, it is often necessary to divert a fluid in a main pipeline or a container to multiple branch pipelines to distribute the fluid for industrial demands, for example such as sample test, fluid performance index testing and circulation for heat dissipation. Gas-source distributors are most widely applied in the industrial fields. A gas-source distributor is disclosed in a Chinese patent CN102788246A. It is used as a bridge between centralized installation of pneumatic instrument and gas main, and facilitates to control the ON-OFF of each pipeline. Since the pipe body of the gas-source distributor is usually narrow in space, a branch pipe connected thereto is often mounted only at the outer side unilaterally. The branch pipeline joint of the gas-source distributor often adopts a traditional structure shown in FIG. 1. In such structure, the main duct 100 is drilled by a special drill and deformed by the friction and squeeze of the drill, forming a columnar platform 101. The columnar platform 101 is formed as a female thread 102 after being milled and tapped. The female thread 102 is engaged with a male thread 202 of a joint 200 having a central hole 201, and a sealing piece 500 put annularly around the joint 200 forms a sealing of the gap of the thread engagement after being pressed by a washer 400 and a nut 300. The milled radial plane of the columnar platform 101 is a sealing plane, which facilitates the sealing piece 500 to be sealed. In the traditional joint shown in FIG. 1, the female thread 102 demands sufficient length to ensure the join strength with the joint 200, which requires that the thickness T of the wall of the main duct 100 is large enough to form a columnar platform 101 having sufficient height, so as to meet the processing for the sealed radial plane and to ensure the join strength. Such size T is usually required to be much larger than the thickness of the wall required upon the fluid pressure of the main duct 100, which leads to a bulky main duct 100, hence demanding an improvement.

SUMMARY OF THE INVENTION

According to a fluid shunt device provided by the present invention, with a thin-wall duct, the fluid shunt device can realize the joining and sealing of a device connected a main pipeline or a container to branch pipelines.

A fluid shunting device comprises a container and one or more branch pipeline connection devices; the container comprises at least one main fluid duct and further comprises circular holes disposed at a cylindrical wall of the container and fitted with a plurality of the branch pipeline connection devices; the branch pipeline connection device comprises a joint, a gland, a sealing piece and a lock piece; the joint is a substantially circular tube, having a central hole, a front end for inserting into the circular hole, and a rear end for joining with an external equipment; the gland comprises an inner hole, a stress-bearing surface and an annular cylinder surface that is basically fitted well with the cylindrical wall of the container, and the stress-bearing surface is pressed directly or indirectly against the joint; the front end of the joint is passed sequentially through the inner hole of the gland and the sealing piece, inserted into the container via the circular hole, and connected with the lock piece in the container, thus the sealing piece is clamped by the joint tightly between the container and the gland along the axial direction of the joint.

According to the present invention, the sealing way for the branch pipeline connection device and the container (main pipeline) is reliable, which is free of a processing for a flat sealing surface, thus simplifying the processing technique; in addition, the joining way for the branch pipeline connection device and the container (main pipeline) is realized in a snap-fit manner within the container, which is free of a processing for forming a columnar platform on the container, thus substantially reducing the requirement of the wall thickness of the container and the difficulty of drilling the container, and decreasing cost.

DETAILED DESCRIPTION OF THE EMBODIMENTS

To be handy for comprehending the present invention, embodiments as well as a mounting process of the present invention will be offered from the following detailed description taken in conjunction with the accompanying drawings.

Embodiment I

Figure 2:
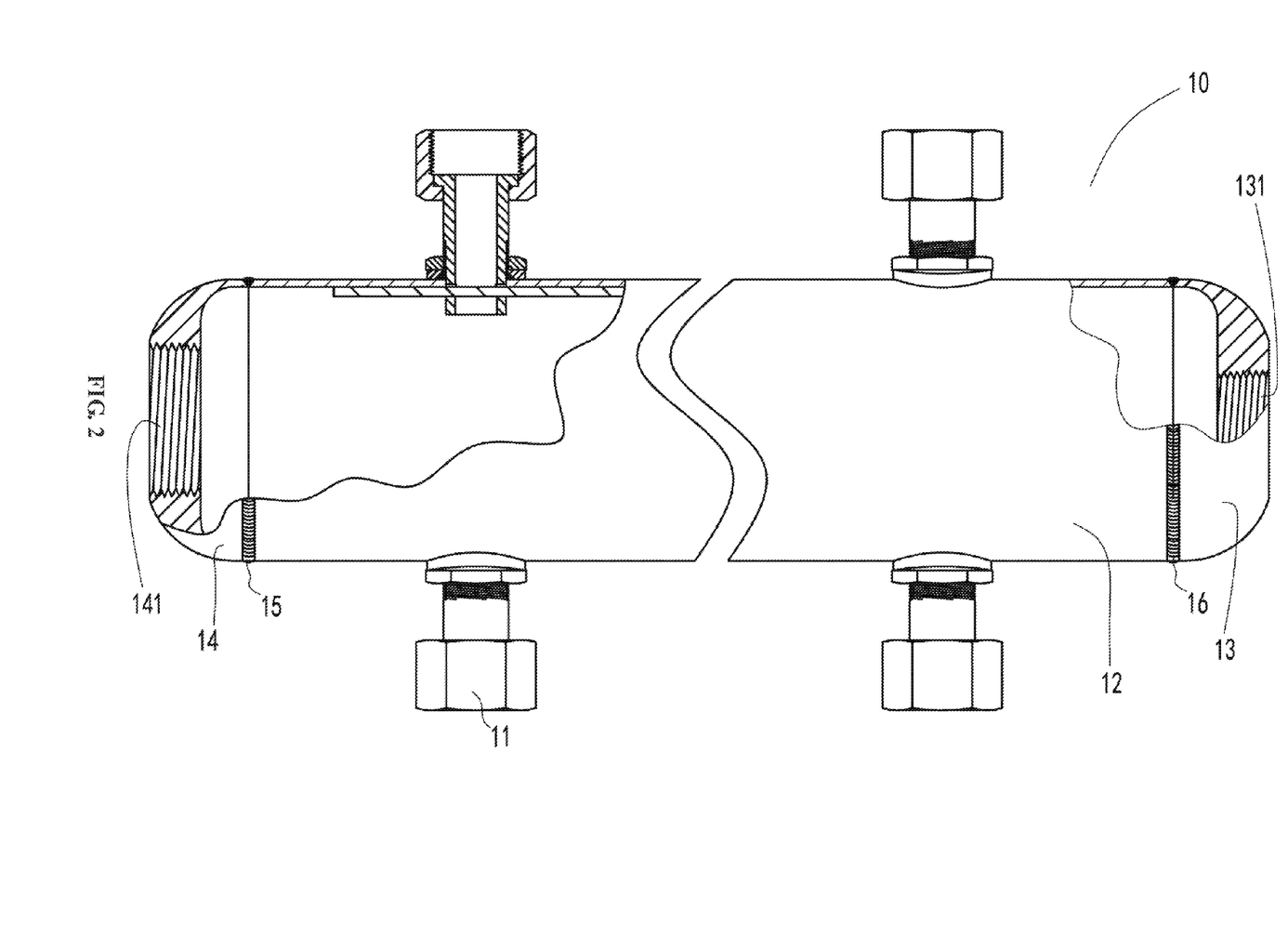
FIG. 2 is a structural diagram of the fluid shunt device according to an embodiment of the present invention.

A fluid shunt device, as shown in FIG. 2, comprises a container 10 accommodating or receiving fluids, multiple pieces of branch pipeline connection devices.

The container comprises a tube body 12 and end caps 13, 14 welded to the tube body 12. The tube body 12 is a circular tube with multiple circular holes 121 (see FIG. 7) disposed at the surface thereof. The end cap 13 is provided with a threaded branch interface 131 while the end cap 14 is provided with a main duct interface 141 of the container.

Figure 3A:
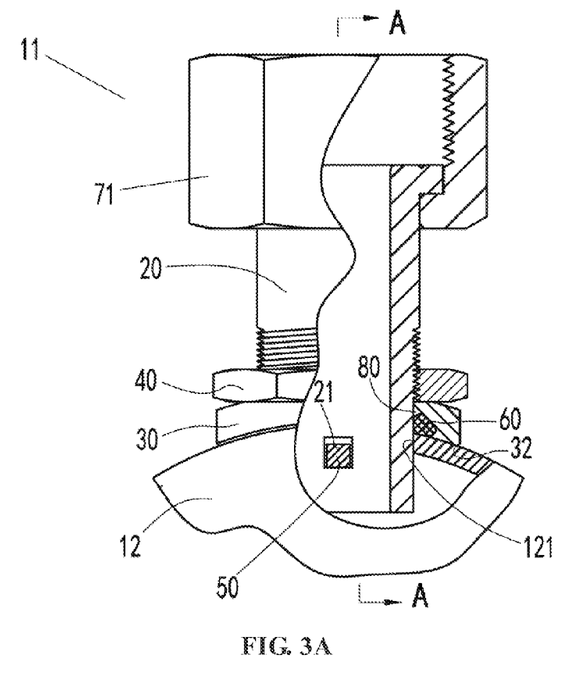
FIG. 3A is a sectional view of the branch pipeline connection device according to an embodiment of the present invention.
Figure 3B:
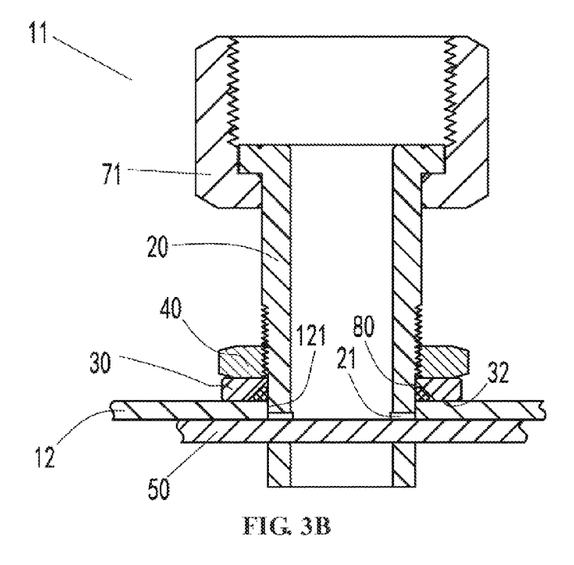
FIG. 3B is a schematic diagram of FIG. 3A along plane A-A according to an embodiment of the present invention.
Figure 4:
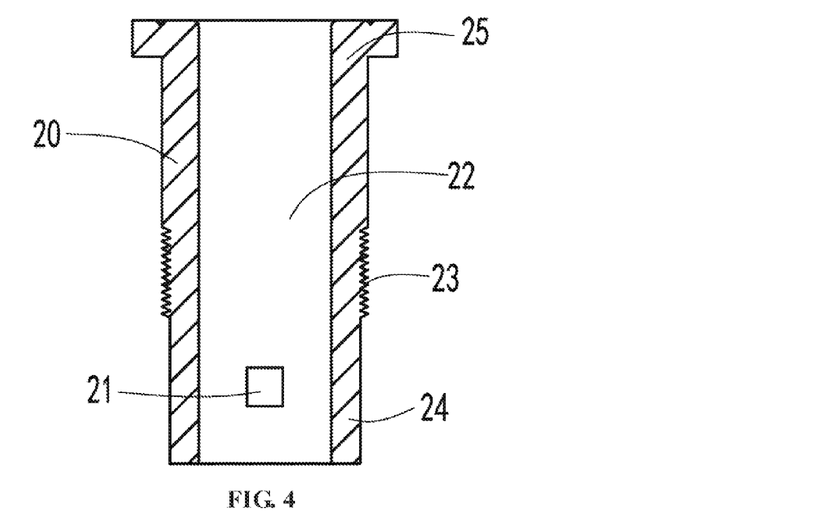
FIG. 4 is a sectional view of the joint according to an embodiment of the present invention.
Figure 5A:
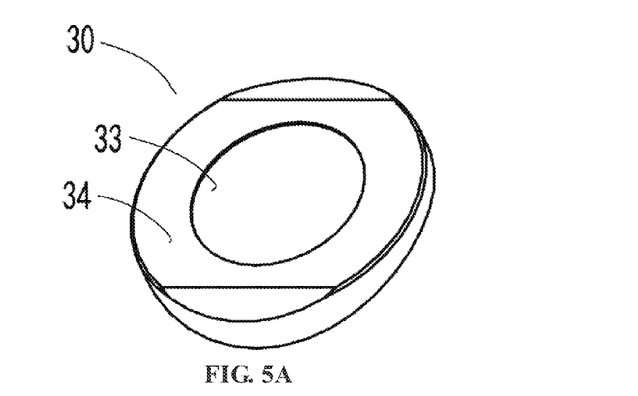
FIG. 5A and FIG. 5B are three-dimensional diagrams of the gland according to an embodiment of the present invention.
Figure 5B:
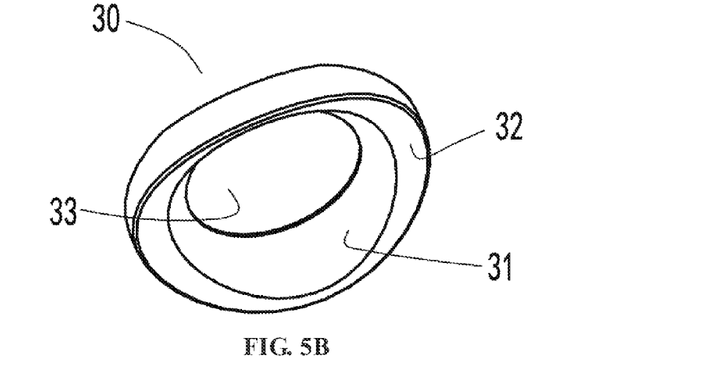
Figure 6:
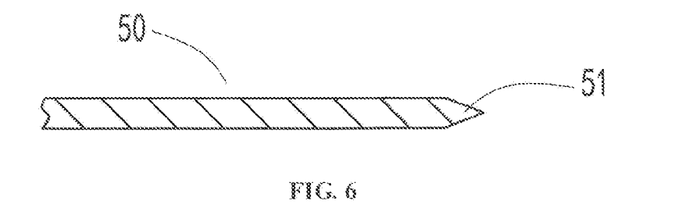
FIG. 6 is a structural diagram of the pin according to an embodiment of the present invention.
Figure 7:
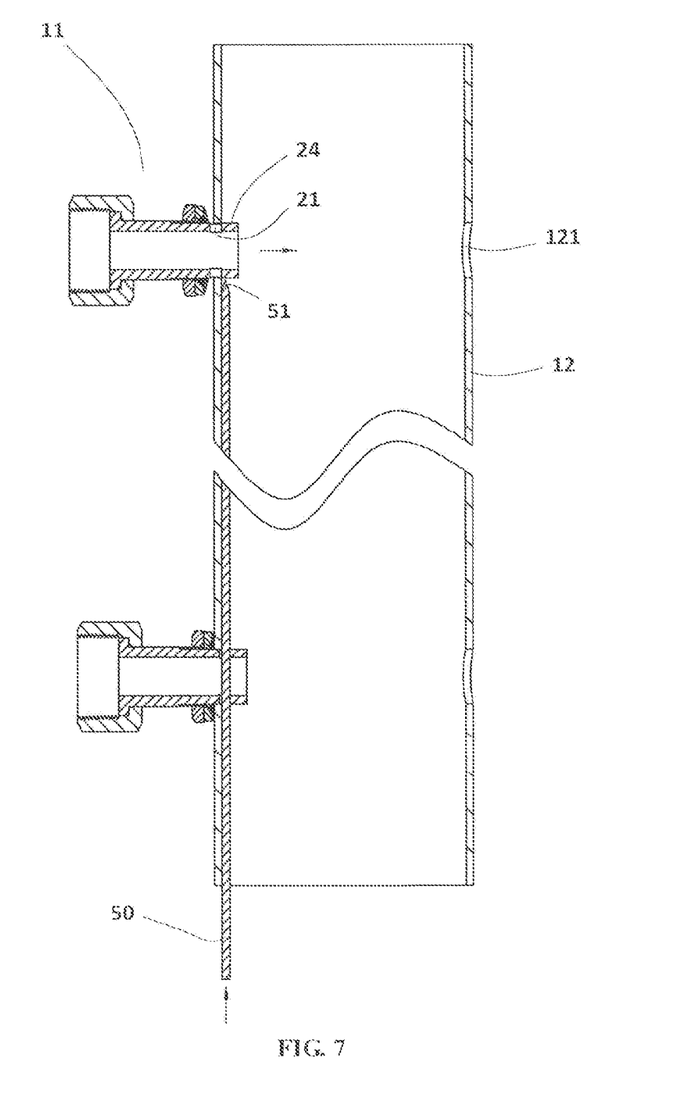
FIG. 7 is a mounting diagram of the branch pipeline connection device according to an embodiment of the present invention.

The branch pipeline connection device 11, as shown in FIGS. 3A & 3B, comprises a joint 20, a hold-down nut 40, a gland 30, a sealing piece 60, a pin 50 (see FIG. 6), and a connecting nut 71. The joint 20 (see FIG. 4) is roughly circular-tube in shape, having a central hole 22, a male thread 23, a front end 24, a rear end 25 and a pin hole 21 radially penetrating through the side wall of the front end 24. The gland 30 (see FIGS. 5A&5B) comprises an annular cylinder surface 32, a tapered inner hole 33 and a stress-bearing surface 34, wherein the annular cylinder wall 32 has a geometric radius that is basically fitted well with the outer wall of the tube 12, and the tapered inner hole 33 has a tapered side wall 31. FIG. 7 illustrates a mounting process: the front end 24 of the joint 20 is passed sequentially through the connecting nut 71, the hold-down nut 40, the gland 30 and the sealing piece 60, and inserted into the tube body 12 via the circular holes 121, the pin 50 is extended into the tube 12 and inserted into the pin hole 21, finally the hold-down nut 40 is screwed to apply force on the stress-bearing surface 34 to clamp the gland 30 and the outer wall of the tube body 12 tightly along an axial direction of the joint 20, which presses the sealing piece 60 into deformation, and restricts it within an annular cavity 80 formed by the outer wall of the front end 24, the side wall 31 and the outer wall of the tube body 12, thus fulfilling the sealing for the gap between the joint 20 and the gland 30 and for the gap between the gland 30 and the outer wall of the tube body 12. In an actual application, the multiple branch pipeline connection devices connected to the tube body 12 are usually arranged along linear configuration, for example, in this embodiment, the branch pipeline connection devices are arranged into two columns, and each column has half number of all the devices. Each column shares a same pin 50. Such structure of sharing one pin 50 can improve anti-torque performance of the branch pipeline connection devices as well as increasing the speed of assembly. To further improve the speed of assembly, the pin 50 has a tiny leading-in end 51, handy for inserting the pin 50 into the pin hole 21.

After all the branch pipeline connection devices are mounted fixedly to the tube body 12, the end caps 13, 14 are welded to both ends of the tube body 12 respectively, forming welds 15, 16; the end cap 14 is provided with a main fluid duct 141 for receiving a fluid, and the end cap 13 is provided with a threaded interface 131 that is used to match an external device or a duct.

Embodiment II

Figure 8:
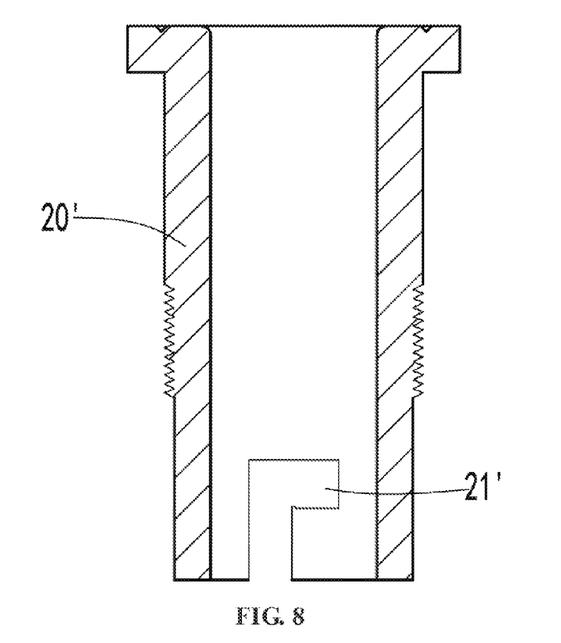
FIG. 8 is a sectional view of the joint according to the embodiment II of the present invention.

A fluid shunt device comprises a container, accommodating or receiving fluids, and multiple pieces of branch pipeline connection devices. The difference between this embodiment and Embodiment I is as follows: the container of this embodiment is a thin-walled tube body unblocked along the axial direction for the circulation of the fluids; besides, a specific structure of the joint for the multiple branch pipeline connection devices is also slightly different from that of Embodiment I. The specific structure is shown in FIG. 8. In FIG. 8, the pin hole 21' at the joint 20' is open and inverted-L type, which is handy not only for the pin hole 21' to match with the pin, but for the demounting and remounting of the joint.

Embodiment III

Figure 9:
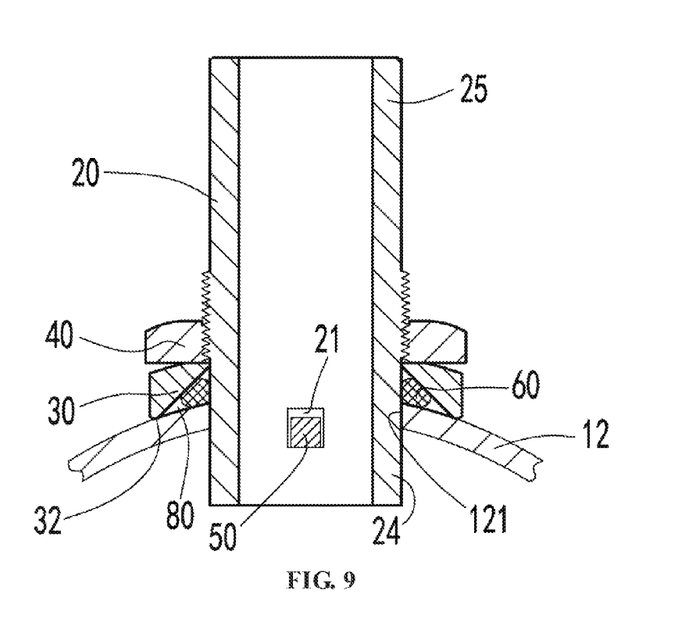
FIG. 9 is a sectional view of the branch pipeline connection device according to the embodiment III of the present invention.

A fluid shunt device is substantially the same as in Embodiment I, except that the branch pipeline connection device has the joint shown in FIG. 9 but without the connecting nut of the Embodiment I, and the hold-down nut 40 of this embodiment is available to screw in from the front end 24 or from the back end 25 during mounting.

Embodiment IV

Figure 10:
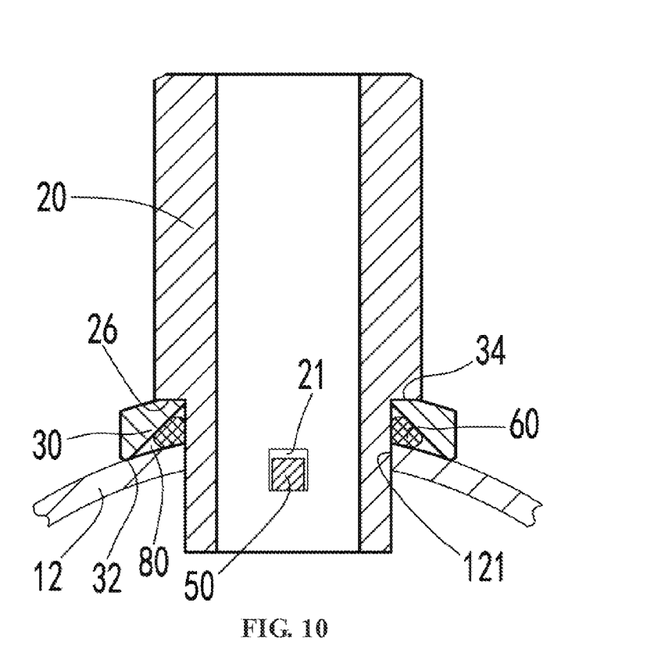
FIG. 10 is a sectional view of the branch pipeline connection device according to the embodiment IV of the present invention.

A fluid shunt device is substantially the same as in Embodiment I, except that the branch pipeline connection device has no hold-down nut, as shown in FIG. 10, the stress-bearing surface 34 of the gland 30 of the branch pipeline connection device is pressed directly against the protrusion 26 of the joint 20. When assembling the branch pipeline connection device of this embodiment with the container 12, a pressing force towards the container 12 is required to apply on the joint 20 to facilitate the insertion of the pin 50 into the pin hole 21.

Embodiment IV

Figure 11:
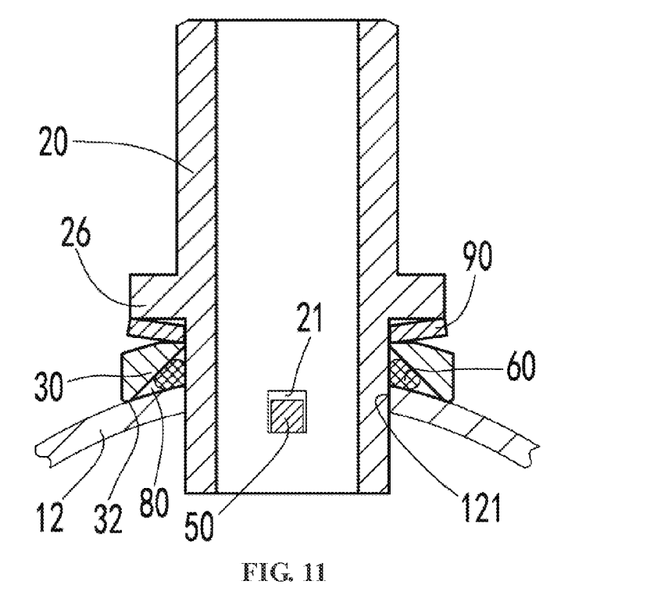
FIG. 11 is a sectional view of the branch pipeline connection device according to the embodiment V of the present invention.

A fluid shunt device is substantially the same as in Embodiment IV (FIG. 10), except that the branch pipeline connection device possesses a structure shown in FIG. 11, i.e., an elastic piece 90 is disposed between the protrusion 26 and the gland 30, for instance, a disc spring or a spring, and the stress-bearing surface 34 is pressed indirectly against the protrusion 26 through the disc spring. Such structure can basically keep a constant pressing force imposed on the sealing piece 60, get more stable sealing effect, and boost the speed of mounting the branch pipeline connection device to the container.

Embodiment VI

Figure 12:
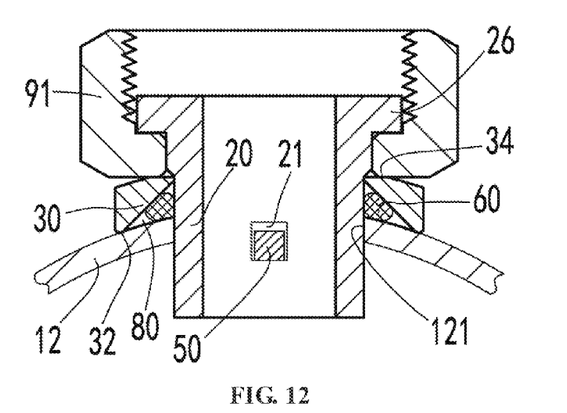
FIG. 12 is a sectional view of the branch pipeline connection device according to the embodiment VI of the present invention.

A fluid shunt device, as shown in FIG. 12, is substantially the same as in Embodiment IV (FIG. 10), except that the branch pipeline connection device includes a connecting nut 91 disposed on the joint 20 for the connection with an external device or a duct, and the stress-bearing surface 34 of the gland 30 is indirectly pressed against the protrusion 26 through the connecting nut 91.

Embodiment VII

Figure 13:
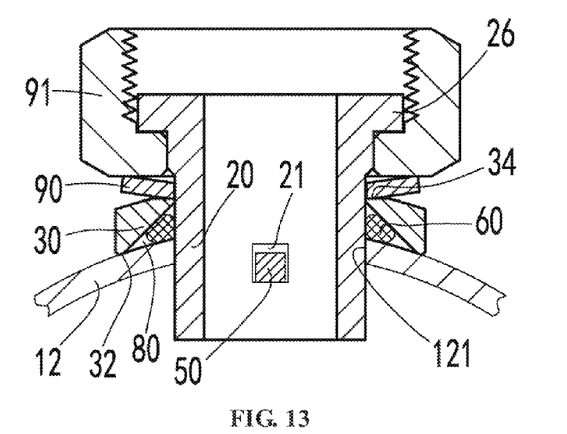
FIG. 13 is a sectional view of the branch pipeline connection device according to the embodiment VII of the present invention.

A fluid shunt device, as shown in FIG. 13, is substantially the same as in Embodiment VI (FIG. 12), except that an elastic piece 90 is disposed between the connecting nut 91 and the gland 30, for instance a disc spring or a spring, and the stress-bearing surface 34 is pressed indirectly against the protrusion 26 through the disc spring. Such structure can basically keep a constant pressing force imposed on the sealing piece 60, get more stable sealing effect, and boost the speed of mounting the branch pipeline connection device to the container.

Embodiment VIII

Figure 14:
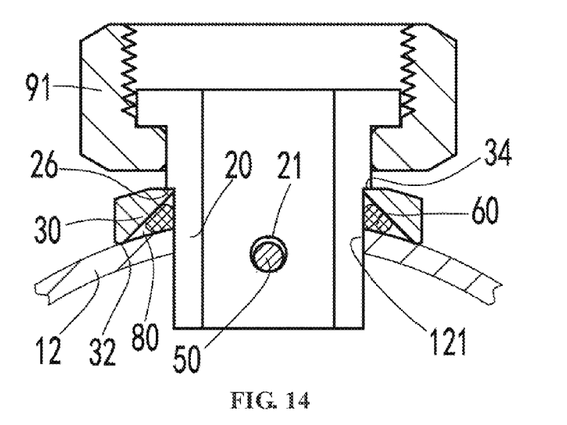
FIG. 14 is a sectional view of the branch pipeline connection device according to the embodiment VIII of the present invention.

A fluid shunt device, as shown in FIG. 14, is basically identical to Embodiment IV (FIG. 10), except that the branch pipeline connection device further includes a connecting nut 91 disposed on the joint 20 for the connection with an external device or a duct, and the stress-bearing surface 34 of the gland 30 is directly pressed against the protrusion 26. The pin 50 is cylindrical in shape and the pin hole 21 is a round hole.

Embodiment IX

Figure 15:
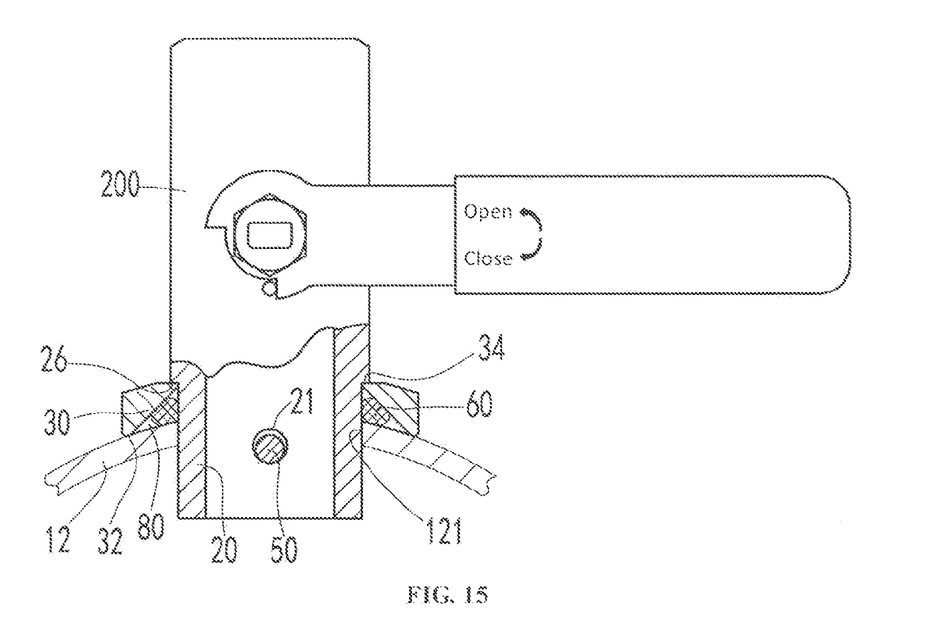
FIG. 15 is a sectional view of the branch pipeline connection device according to the embodiment IX of the present invention.

A fluid shunt device, as shown in FIG. 15, is basically identical to Embodiment IV (FIG. 10), except that the joint 20 of the branch pipeline connection device is a part of a valve 200. In this embodiment, the joint 20 is an input of the valve 200.

Embodiment X

The method of manufacturing the gland of Embodiments I-IX, comprises the following steps:
  a. cutting or stamping out a plate perform body;
  b. bending the perform body into a cylinder plate with a specified radius, wherein the radius is equivalent to the radius of the tube body in Embodiment I, and the inner side of the cylinder plate matches with the tube body;
  c. producing a tapered inner hole on the cylinder plate, wherein the step c specifically comprises the following two steps: c1. producing a cylindrical inner hole on the cylinder plate; c2. processing the cylindrical inner hole into a tapered inner hole. After the processing of the step c, the rest of the inner cylindrical wall is substantially an annular cylindrical wall.

More specifically, the side wall of the tapered inner hole can be drilled to be molded by a forming drill. In order to have a stable support for the gland, the outer cylindrical wall of the gland is usually processed into a flat stress-bearing surface 34 (see FIG. 5A).

By comparing the manufacturing method of the gland in this invention with the casting process, the thickness of the gland can be thinner; by comparing with the forging process, the processing costs can be lowered down, and the metallography of the gland is not changed; by comparing with the traditional method which processes the perform body directly by using the milling process of CNC machining center, both the raw material costs and processing costs can be lowered down.

The above embodiments are only a specific implementation, it should be understood that, the container may take a number of specific structures, such as a flask-shaped structure with only one main duct, or even just a round tube. In every embodiment of the present invention, the joint for the branch pipeline connection devices takes the connection mode of a pinhole inserted by a pin. The way to use a pin for the lock piece may have the following advantages: no needs of using clamping tools in the container during mounting, quick connecting, and sharing one common pin for multiple branch pipeline connection devices. It should be understood that the lock piece also can adopt a traditional structure—nut, for instance, the front end of the joint is provided with a male thread, and the nut is engaged with the male thread within the container to achieve a fixed connection.

What is claimed is:

1. A fluid shunt device, comprising a container and one or more branch pipeline connection devices; said container comprising at least one main fluid duct, and further comprising circular holes disposed at a cylindrical wall of said container and fitted with a plurality of said branch pipeline connection devices;
  wherein
  said branch pipeline connection device comprises a joint, a gland, a sealing piece and a lock piece; the joint is a substantially circular tube, having a central hole, a front end for inserting into the circular hole and a rear end for joining with an external equipment; the gland comprises a tapered inner hole, a stress-bearing surface and an annular cylinder surface that is basically fitted well with the cylindrical wall of said container wherein the joint is provided with a protrusion, and the stress-bearing surface of the gland is pressed against the protrusion of the joint; the front end of the joint being passed sequentially through the inner hole of the gland and the sealing piece, inserted into said container via the circular hole, and connected with the lock piece in said container, so that the sealing piece is clamped tightly by the joint between said container and the gland along an axial direction of the joint.

2. The fluid shunt device as recited in claim 1, wherein the sealing piece is squeezed into elastic deformation by the joint, the gland and the cylindrical wall of said container; and the sealing piece is pressed onto the joint, the gland and the cylindrical wall of said container.

3. The fluid shunt device as recited in claim 2, wherein the inner hole comprises a tapered side wall, where the side wall, the outer wall of the front end of the joint and the outer wall of said container form an annular cavity; the sealing piece is located in the annular cavity for sealing the gap between the joint and the gland and the gap between the gland and the outer wall of said container.

4. The fluid shunt device as recited in claim 3, wherein the lock piece is a pin, and the front end of the joint is provided with a pin hole, where the pin is inserted into the pin hole within said container.

5. The fluid shunt device as recited in claim 4, wherein there is a plurality of said branch pipeline connection devices arranged in one or multiple linear arrays, there are one or more pins, and each array of said branch pipeline connection devices shares a same pin.

6. The fluid shunt device as recited in claim 1, wherein the device further comprises an elastic piece disposed between the protrusion and the gland, and the stress-bearing surface is pressed indirectly against the protrusion through the elastic piece.

7. The fluid shunt device as recited in claim 1, wherein the device further comprises a connecting nut disposed on the joint and used for the connection with an external device or a duct, and the stress-bearing surface of the gland is pressed indirectly against the protrusion through the connecting nut.

8. The fluid shunt device as recited in claim 7, wherein the device further comprises an elastic piece disposed between the connecting nut and the gland, and the stress-bearing surface is pressed indirectly against the protrusion through the elastic piece and the connecting nut.

9. The fluid shunt device as recited in claim 1, wherein the device further comprises a hold-down nut which is engaged with a thread provided on the joint; and the stress-bearing surface is pressed indirectly against the joint through the hold-down nut.

10. The fluid shunt device as recited in claim 9, wherein the inner hole comprises a tapered side wall, where the side wall, the outer wall of the front end of the joint and the outer wall of said container form an annular cavity; the sealing piece is located in the annular cavity for sealing the gap between the joint and the gland and the gap between the gland and the outer wall of said container.

11. The fluid shunt device as recited in claim 10, wherein the lock piece is a pin, and the front end of the joint is provided with a pin hole, where the pin is inserted into the pin hole within said container.

12. The fluid shunt device as recited in claim 1, wherein the annular cylinder wall is a concave surface basically fitted with the cylindrical wall of said container.

13. The fluid shunt device as recited in claim 1, wherein the inner hole comprises a tapered side wall, where the side wall, the outer wall of the front end of the joint and the outer wall of said container form an annular cavity; the sealing piece is located in the annular cavity for sealing the gap between the joint and the gland and the gap between the gland and the outer wall of said container.

14. The fluid shunt device as recited in claim 13, wherein the lock piece is a pin, and a pin hole is disposed at the front end of the joint, where the pin is engaged with the pin hole within said container.

15. The fluid shunt device as recited in claim 14, wherein there is a plurality of said branch pipeline connection devices arranged in one or multiple linear arrays, there are one or more pins, and each array of said branch pipeline connection devices shares a same pin.

16. The fluid shunt device as recited in claim 15, wherein the pin has a tiny leading-in end.

17. The fluid shunt device as recited in claim 1, wherein the lock piece is a pin, and the front end of the joint is provided with a pin hole, where the pin is inserted into the pin hole within said container.

18. The fluid shunt device as recited in claim 17, wherein the pin hole is an open groove structure.

19. The fluid shunt device as recited in claim 18, wherein there is a plurality of said branch pipeline connection devices arranged in one or multiple linear arrays, there are one or more pins, and each array of said branch pipeline connection devices shares a same pin.

\* \* \* \* \*